US006680482B1

(12) United States Patent  
Perrins et al.

(10) Patent No.: US 6,680,482 B1  
(45) Date of Patent: Jan. 20, 2004

(54) CARTRIDGE PRODUCT IRRADIATOR

(75) Inventors: Robert Edward Perrins, Kanata (CA); Roderick Dit Hing Chu, Ottawa (CA)

(73) Assignee: MDS (Canada) Inc., Kanata (CA)

( * ) Notice: Subject to any disclaimer, the term of this patent is extended or adjusted under 35 U.S.C. 154(b) by 0 days.

(21) Appl. No.: 09/568,516

(22) Filed: May 9, 2000

(51) Int. Cl.[7] ............................................. G01N 21/00
(52) U.S. Cl. .................... 250/492.1; 250/453; 250/455; 250/436; 250/492 R; 378/69; 378/64; 198/712; 198/845
(58) Field of Search ...................... 250/492.1, 106 R, 250/52, 453, 455, 433, 436, 492 R; 378/69, 64; 198/712, 838, 845

(56) References Cited

U.S. PATENT DOCUMENTS

| | | |
|---|---|---|
| 3,417,239 A | 12/1968 | Blache-Fraser et al. |
| 3,564,241 A | 2/1971 | Ludwig |
| 3,673,409 A | 6/1972 | Green |
| 3,676,675 A | 7/1972 | Ransohoff et al. |
| 4,018,348 A | 4/1977 | Bosshard |
| 4,066,907 A | 1/1978 | Tetzlaff |
| 4,151,419 A | 4/1979 | Morris et al. |
| 4,481,652 A | 11/1984 | Ransohoff |
| 4,561,358 A | 12/1985 | Burgess |
| 4,760,264 A | 7/1988 | Barrett |
| 4,852,138 A | 7/1989 | Bergeret et al. |
| 4,864,595 A | 9/1989 | Barrett |
| 4,908,221 A | 3/1990 | Barrett |
| 5,001,352 A | 3/1991 | Tetzlaff |
| 5,008,550 A | * 4/1991 | Barrett ........................ 198/712 |
| 5,396,074 A | * 3/1995 | Peck et al. ............. 250/453.11 |
| 5,400,382 A | * 3/1995 | Welt et al. ............. 250/453.11 |

OTHER PUBLICATIONS

Product Information Brochure, Tote Irradiator, JS–9500 & JS–9600, Nordion International, Inc., 1994.
Product Information Brochure, JS–9500/9600 Tote, Performance Data Sheet 9501, Nordion International, Inc., 1994.
Product Information Brochure, JS–10000 High performance Tote Irradiator, Nordion International, Inc., 1994.
Product Information Brochure, Carrier Irradiator JS–8900 Unit Carrier, Nordion International, Inc., 1993.

* cited by examiner

Primary Examiner—John R. Lee
Assistant Examiner—Zia R. Hashmi
(74) Attorney, Agent, or Firm—Brinks Hofer Gilson & Lione

(57) ABSTRACT

The present invention relates to a product irradiator having a cartridge loading system. The cartridge comprises a plurality of carriers or totes which are transported as a single mass into an irradiation chamber for radiation processing. Products contained within the totes are irradiated while on the cartridge, but individual totes are transferred around the radioactive source by a tote transfer system. The cartridge product irradiator permits quick changes of cartridges thereby minimizing the time that the radioactive source is not in use, and also permits good radiation dose uniformity in products. The cartridge product irradiator is thus highly efficient and economical to use.

14 Claims, 15 Drawing Sheets

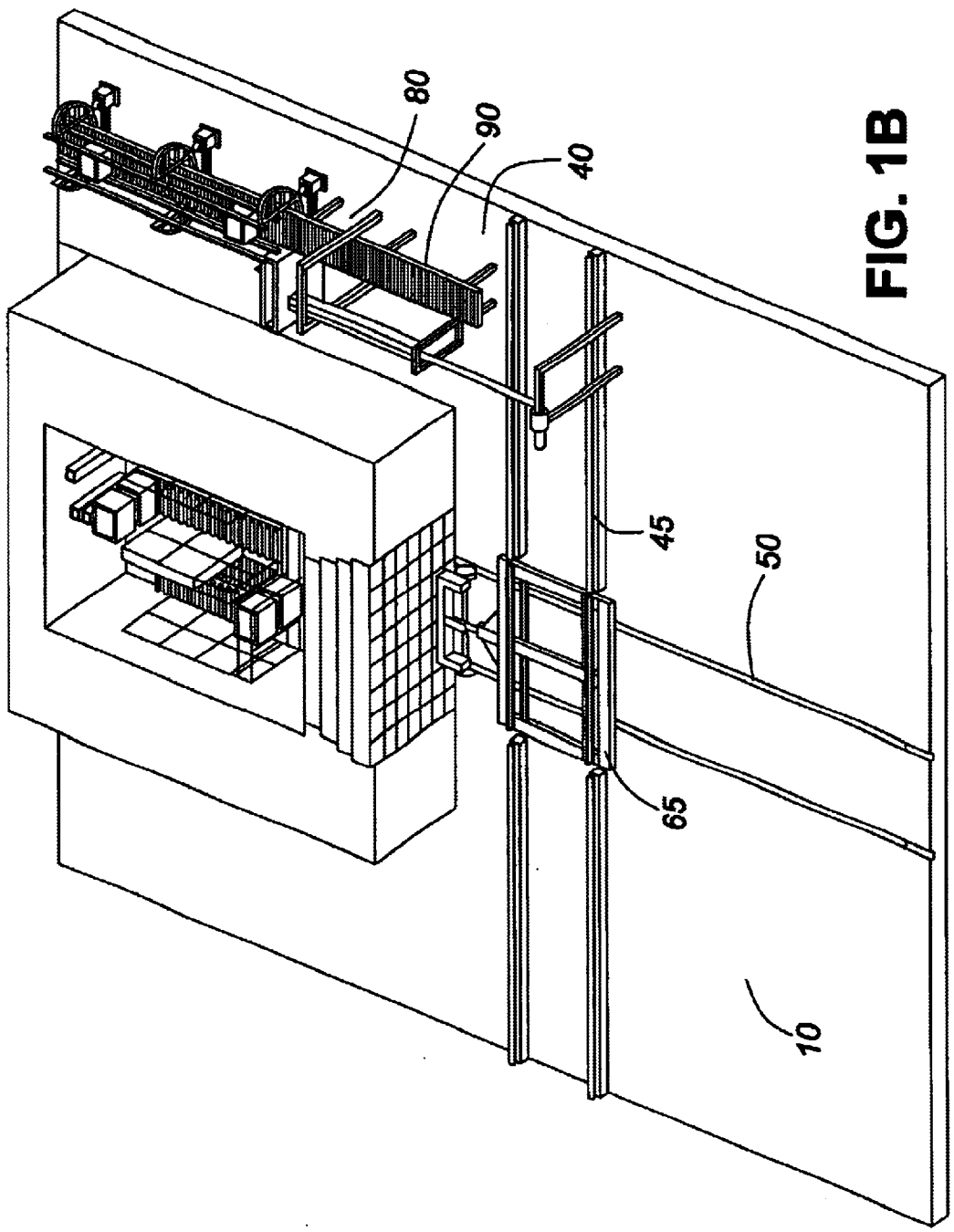

CARTRIDGE PRODUCT IRRADIATOR

The present invention relates to a multipurpose product irradiator. More specifically this invention relates to a cartridge product irradiator useful for irradiating medical, food and other products or articles.

BACKGROUND OF THE INVENTION

Irradiation systems are used for irradiating medical devices, foodstuffs, food utensils, as well as other goods such as cosmetics, waste products and the like. Typically high energy ionizing radiation is used as the radiation source, for example gamma radiation, X-ray, electron beam, or the like. The source, in the case of a radioisotope, is typically maintained beneath the irradiation chamber within a pool when not in use, and raised into position as required. Articles of interest are placed upon pallets, or loaded into unique carrier trays or totes, and these pallets or carriers are conveyed past the radiation source in order to expose the contents therein.

Many prior art irradiators utilize conveyors in order to move a product laden carrier past a radiation source, for example U.S. Pat. Nos. 5,396,074, 5,001,352, 4,866,281, 4,852,138, 4,561,358, 4,481,652, 3,676,675 or 3,564,241. These irradiators utilize a source-overlapping-product configuration, and operate with a low efficiency of source utilization. Furthermore, these systems necessitate the use of many moving mechanical parts within the irradiation chamber, yet the environment within the irradiation chamber is hard on many plastics and metals. Such designs are therefor prone to repeated failures that require full shutdown of the irradiator for repair. Similarly, other transport systems, (U.S. Pat. Nos. 4,066,907, 4,018,348) use turntables coupled with conveyor systems to expose a product to a source. These systems also comprise many moving parts within the irradiation chamber, and necessitate substantial product handling within the irradiation chamber.

Other irradiators have adopted an alternate transport system with which to move a product past a source. In U.S. Pat. No. 5,396,074 there is disclosed a facility for irradiating foods and medical devices using an electron beam as the radiation source. An overhead transport conveyor is used to suspend article carriers to permit their movement around a track and to bring these carriers in front of the radiation source. The suspended article carriers are capable of rotating upon their vertical axes which permits radiation of two sides of a product disposed within the article carrier. This design permits exposure of both sides of the article carrier to the radiation source. However, radiation by electron beam may result in a poor depth of penetration in medium to high density products (i.e. over about 0.4 g/cc), and extensive repackaging is required in order for such products to be treated effectively with a low resulting DUR. This type of irradiator therefore has a limited use. A similar conveying system is found in U.S. Pat. Nos. 4,481,652 and 3,673,409, with carriers that are suspended from a monorail-type track.

U.S. Pat. No. 5,400,382 is directed to irradiating products, located on pallets moved on shuttle cars, with gamma rays. The shuttle cars move the pallets into the region of the gamma source, on a series of parallel tracks, and the pallets are transferred from track to track so that each side of the object being irradiated is exposed. Again, with such a design there are many moving parts located within the irradiation chamber thereby minimizing access for maintenance and repair. Furthermore, these irradiators use a source-overlapping-product configuration which results in a low efficiency of radiation utilization.

Several irradiator designs do not require the introduction of the source into the irradiation chamber, rather the product is lowered into the pool surrounding the source. For example, U.S. Pat. No. 3,676,675 is directed to a subterranean production irradiator with a product conveyor system comprising an endless chain and sprockets arranged to permit movement of specialized product carriers past an radiation source. The product carriers are hung from the chain, and pass over and under the source in a sinusoidal path. A similar approach is disclosed in U.S. Pat. Nos. 4,760,264; 4,908,221; 5,008,550 which incorporates a water-tight duct system through which carriers are passed. The conveyor system comprises a continuous chain in order to move the product through the duct system. In all of these designs, the speed of the conveyor effects all carriers attached to the conveyor, any variation in speed affects all product carriers at the same time throughout the ductwork. Any mechanical problem localized within the subterranean irradiation chamber is also very difficult to repair, and this is complicated by the fact that the source can not be easily removed from the irradiation chamber resulting in time consuming maintenance or repair procedures. Due to the types of carriers employed, extensive product handling in order to load and unload the carriers from, and to, a pallet is required.

U.S. Pat. No. 4,561,358 is directed to an apparatus for conveying elongated articles through a radiation beam. The conveying means comprises two overhead tracks, and a guide that associates with, but is located below the carrier to direct the orientation of the article and permit both sides of the article to be exposed to the radiation source. U.S. Pat. No. 3,564,241 is directed to an irradiation apparatus comprising a continuous horizontal track to form a single path around a radiation source.

U.S. Pat. No. 4,066,907 discloses the use of a turntable with several levels that circumscribes a vertically placed source. This configuration permits the partial exposure of the top and bottom of the product to the source. The product is moved onto the turntable by a goods handling appliance, such as a fork lift coupled with a telescopic table. The same goods handler is also used to transfer product between levels of the turntable in order to permit exposure of the sides and a portion of the top and bottom of the product to the source. All of this material handling takes place within the irradiation chamber. Due to the harsh environment within the irradiation chamber, routine maintenance requires shutdown of the irradiator. The carriers used within such irradiators also require extensive product handling and repackaging in order to load and unload the carriers. These irradiators also employ a source-overlapping-product configuration which results in a low efficiency of radiation utilization.

U.S. Pat. No. 4,864,595 discloses a simplified bulk-loaded product irradiator that utilizes large canisters each containing approx. 10,000 lbs of product that can be loaded directly from a truck into the irradiator.. Large canisters are used so that handling of the product is minimized. However, the use of such large canisters results in a poor dose uniformity within the product itself as products close the outside of the canister receive a much higher radiation dose than those positioned within the canister. The use of large canisters may work well with low density products (medical supplies) where dose uniformity is not important. However, this irradiator is unsuitable for use with higher density products, including food.

Several problems exist with most prior art product irradiators. Many designs require considerable carrier handling within the irradiation chamber either to complete a pass around the source, or to effect a change in the level of turntable or conveyor. As a result of the required carrier handling devices and associated mechanisms, as well as track or conveyor configurations, or carrier designs, there is much support or structure between the source and product within many prior art irradiators. This structure attenuates the radiation emitted from the source and reduces the efficiency of radiation utilization within the irradiator. Furthermore, many prior art irradiators adopt a source-overlapping-product configuration and this further results in an a lower efficiency of radiation utilization. Many prior art irradiators are not capable of attaining a low dose uniformity ratio (DUR) within the product which is required for many products, for example foods. Therefore, these designs are only suited for treatment of products of low density.

The environment within the irradiation chamber is also harsh on components that are subject to repeated radiation exposure including the product carriers, transfer mechanisms, pulleys, bearings and track assemblies. For example, gamma radiation, through cross linking, degrades carbon based, and related materials, including lubricants, plastics, non-metallic seals and the like. Furthermore, when the surrounding air is irradiated, ozone is produced which is a strong oxidant that corrodes ferric metals. Therefor, any suitable product irradiator design should consider minimizing the number of moving parts within the irradiation chamber, as well as permitting the easy removal of components repeatedly exposed to radiation in order to minimize downtime of the irradiator.

Prior art irradiator designs necessitate the assembly of components of the irradiator on-site and within the irradiator chamber, since components are brought into the irradiation chamber typically via a roof plug opening. The size of the roof plug opening limits the size of component that may be brought into the irradiation chamber. Therefore, portions of each component are loaded through the roof plug opening, assembled and tested within the chamber.

The cartridge product irradiator of the present invention sets out to overcome the deficiencies identified within the art, and ensures a relatively even dose uniformity ratio (DUR) in a product over a range of product densities. The cartridges of the cartridge product irradiator allow for easy batch product interchange from the irradiator thereby minimizing the time that the radioactive source is not in use. In addition, the number of moving parts contained within the irradiation environment has been reduced in order to minimize effects of radiation and ozone on these components. Furthermore, most of the moving parts spend a substantial portion of time outside the irradiation chamber, which extends their use, reduces maintenance, and provides for easy access, repair and replacement thereby minimizing down time of the product irradiator. Due to the use of hot cell door, large component parts may be manufacture and tested off-site prior to installation within the irradiation chamber. This increases efficiency of, and reduces costs associate with, irradiator construction.

SUMMARY OF THE INVENTION

The present invention relates to a multipurpose product irradiator. More specifically the invention relates to a cartridge product irradiator useful for irradiating medical, food and other products or articles.

According to the present invention there is provided a cartridge product irradiator comprising an irradiation chamber, a cartridge feed system, and a tote transfer system. The cartridge in addition to comprising totes may further comprise a movable chassis for translocating the cartridge into the irradiation chamber. Similarly, the cartridge may also comprise a bed which may be disengaged from the cartridge. The bed may be loaded with carriers or totes containing products at a remote location and be transported to, and engage with, the movable chassis of the cartridge, which subsequently translocates the cartridge into the irradiation chamber. Once inside the irradiation chamber the totes may be rearranged on the bed using a conveying system and the tote transfer system during irradiation processing.

This invention is also directed to a cartridge product irradiator as defined above wherein the tote transfer system comprises pushing systems for pushing carriers or totes along the conveyor system and transfer elements for receiving totes displaced by the pushing system and reorienting the totes along a different row from which the totes were displaced thereby rearranging the totes during irradiation processing. The pushing system may comprise pistons that are pneumatically or hydraulically controlled.

This invention is also directed to a cartridge product irradiator as defined above wherein the tote transfer system is attached to the movable chassis of the cartridge comprises.

This invention is also directed to a cartridge product irradiator as defined above wherein the tote transfer system additionally comprises a tote lifting means to vertically reposition a tote from a first to a second level.

The invention is also directed to a cartridge product irradiator wherein the radiation chamber comprises a radiation source, which may be a gamma radiation source. If the radiation source is a gamma radiation source then the gamma radiation source may be cobalt 60 or cesium 137. This invention also embraces a product irradiator, defined above, wherein said irradiation chamber is temperature controlled and ranges from about −25° C. to about 25° C.

The present invention also pertains to the cartridge product irradiator, wherein the movable chassis comprises a translocation system to permit movement of the movable chassis.

The product irradiator of the present invention overcomes many of the problems identified within the prior art. The number of moving parts exposed to the irradiation chamber environment is reduced in order to minimize effects of irradiation and ozone on the components. Furthermore, the duration of exposure of such moving parts is reduced within the irradiation chamber. The design of the present invention also permits easy removal of components from the irradiation chamber for repair thereby minimizing down time of the product irradiator. The carriers or totes containing the product irradiator of the present invention are designed in order to minimize or eliminate product repackaging, and ensures that palleted goods can be placed onto appropriately sized carriers and, following treatment, can be easily repalleted. These features result in a greater product throughput, and flexibility in the use of the irradiator, permitting a variety of products to be treated. In addition, the cartridge product irradiator of the current invention also permits efficient radioactive source utilization.

The product irradiator as disclosed herein also provides for a improved method of construction of irradiator that allows large pre-manufactured components to be assembled off-site and factory tested, and then installed within the cartridge product irradiator. This improved manufacturing method is possible due to the large entrance into the irradiation chamber provided by the hot cell door.

This summary of the invention does not necessarily describe all necessary features of the invention but that the invention may also reside in a sub-combination of the described features.

BRIEF DESCRIPTION OF THE DRAWINGS

These and other features of the invention will become more apparent from the following description in which reference is made to the appended drawings wherein:

FIG. 1 shows aspects of embodiments of the current invention. FIG. 1(B) shows a perspective view of the cartridge product irradiator with the cartridge feed system within the irradiation chamber.

FIG. 2 shows an aspect of an embodiment of the cartridge of the present invention.

FIG. 5 shows an aspect of an embodiment of the present invention.

DESCRIPTION OF PREFERRED EMBODIMENT

The present invention relates to a multipurpose product irradiator. More specifically this invention relates to a cartridge product irradiator useful for irradiating medical, food and other products or articles.

The following description is of a preferred embodiment by way of example only and without limitation to the combination of features necessary for carrying the invention into effect.

A significant drawback of many of the product irradiators known in the prior art is that the radiation source is used with relatively low efficiency. Gamma radiation sources such as cobalt 60 or cesium 137 cannot be switched off, decay spontaneously over time and can be quite expensive to replace. Therefore, there is a need to optimize the efficiency of use of such a radioactive source in a product irradiator.

In addition to optimizing the use of the radioactive source it is critical that a product irradiator requires minimal maintenance. A major problem with many of the irradiators currently known is that they comprise many moving parts, repairs or maintenance of which render the irradiator unusable.

In order to improve the efficiency of radioactive source utilization, multiple products should be irradiated simultaneously rather than conveying individual products past a radiation source as is done by many of the irradiators known in the art. Also, following suitable irradiation of batches of products, it is equally important that these batches of irradiated products be changed rapidly with batches of product awaiting radiation processing to minimize the time the radioactive source is not in use. Further, since many radioactive sources such as but not limited to cobalt 60 or cesium 137 emit radiation in all directions, it is important that products be distributed around the radioactive source when they are irradiated. A common difficulty encountered when products arranged around a radiation source are irradiated is that products located further from the radiation source receive a lower radiation dose than products located near the radiation source. Therefore it is generally advantageous to shuffle or interchange the positions of the products while they are being irradiated. Such shuffling generally promotes better dosage uniformity in products. Unfortunately, systems which shuffle or interchange products often comprise many moving parts and the damaging effects of radiation on these moving parts generally increases the maintenance of these components and reduces the efficiency of radioactive source utilization if the irradiator must be shut down.

The Product Irradiator

Figure 1A:
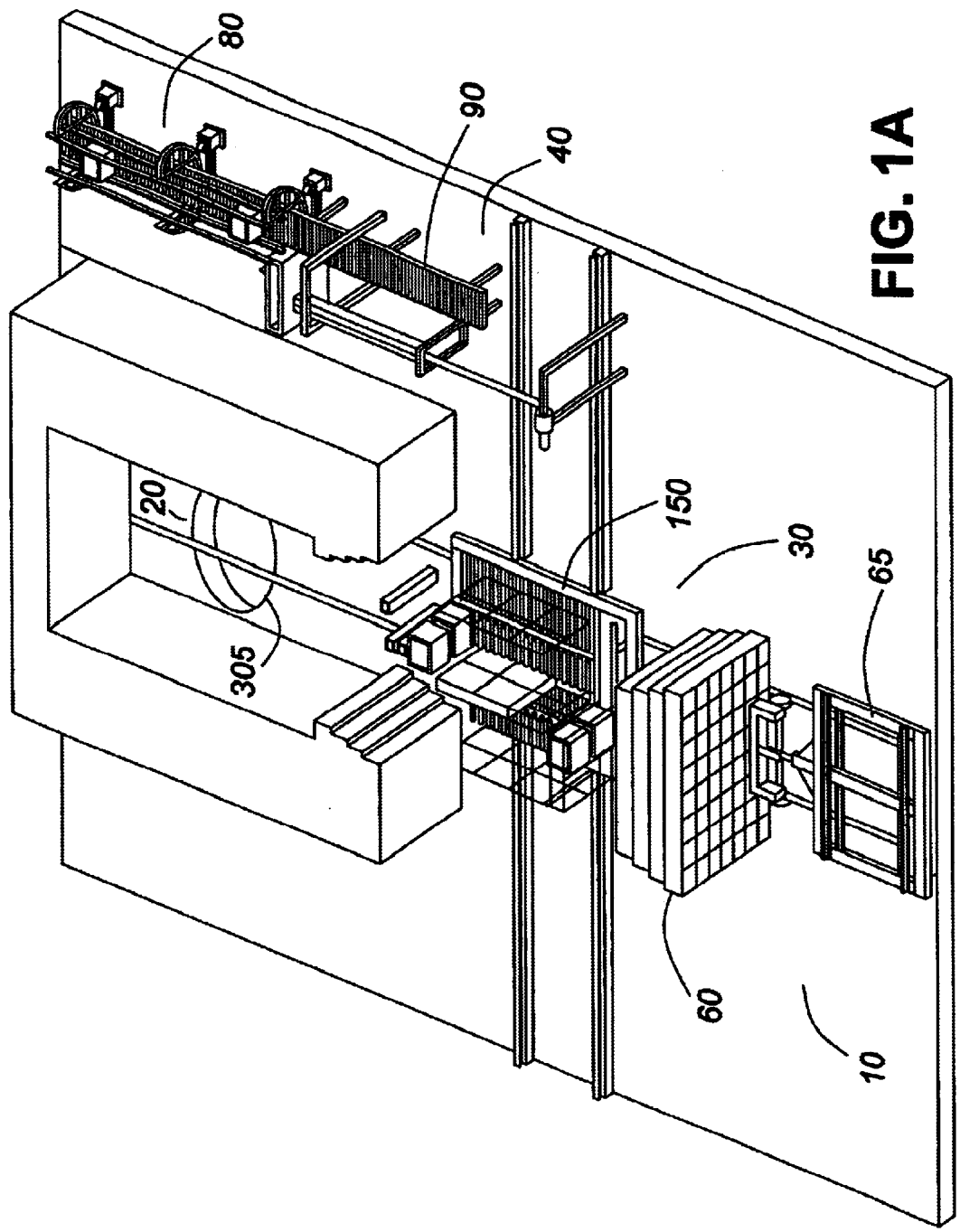
FIG. 1(A) shows a perspective view of the cartridge product irradiator with the cartridge feed system withdrawn from the irradiation chamber.
Figure 1C:
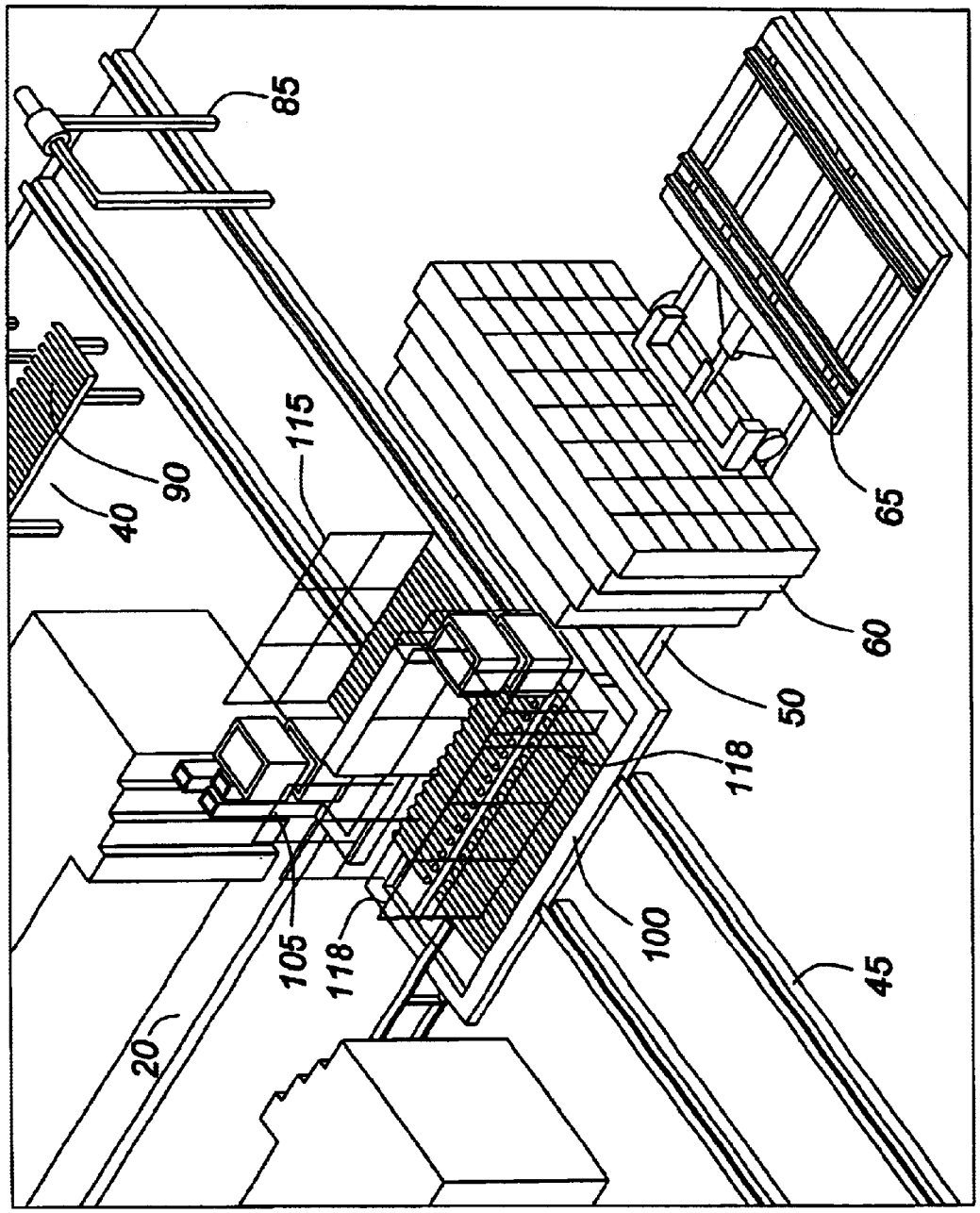
FIG. 1(C) shows an close up of the cartridge fee system of FIG. 1(A)
Figure 2A:
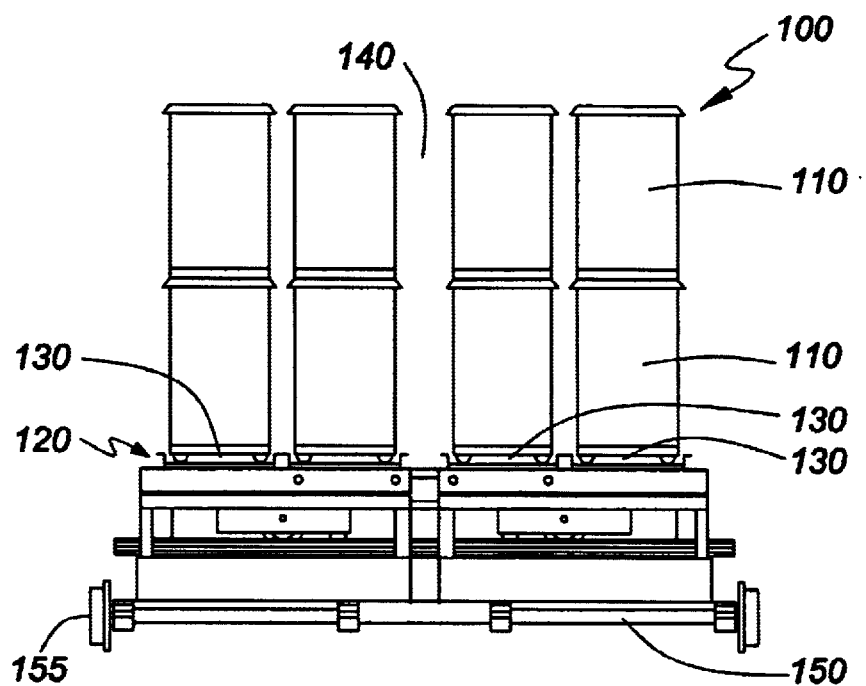
FIG. 2(A) shows an end on view of the cartridge loaded with totes.
Figure 2B:
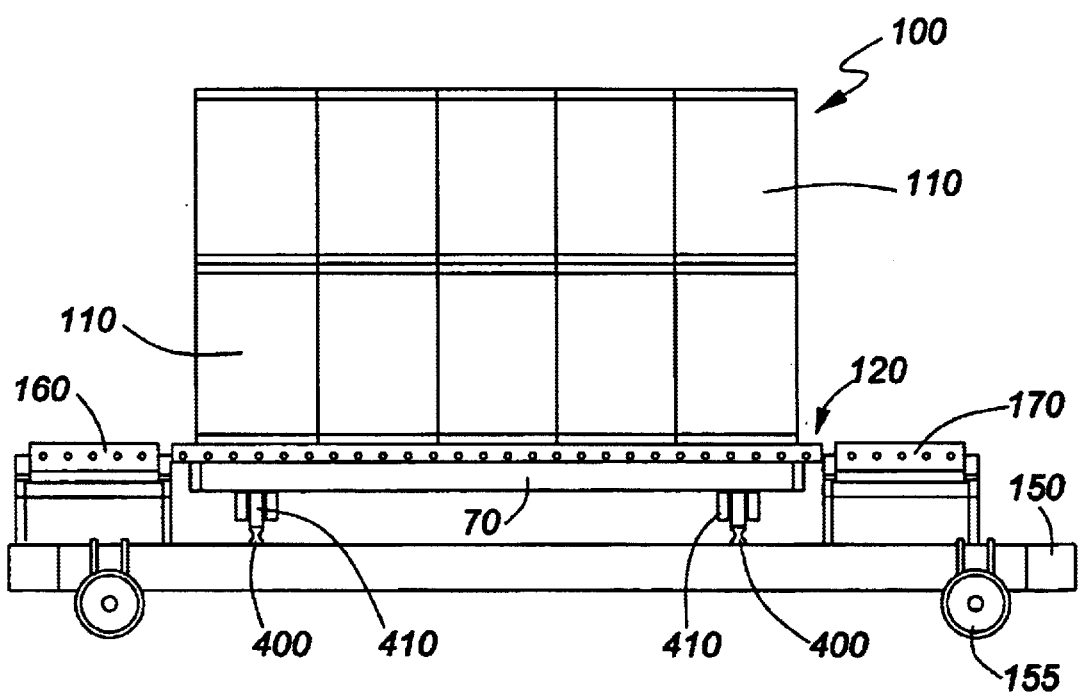
FIG. 2(B) shows a side view of the cartridge loaded with totes.
Figure 2C:
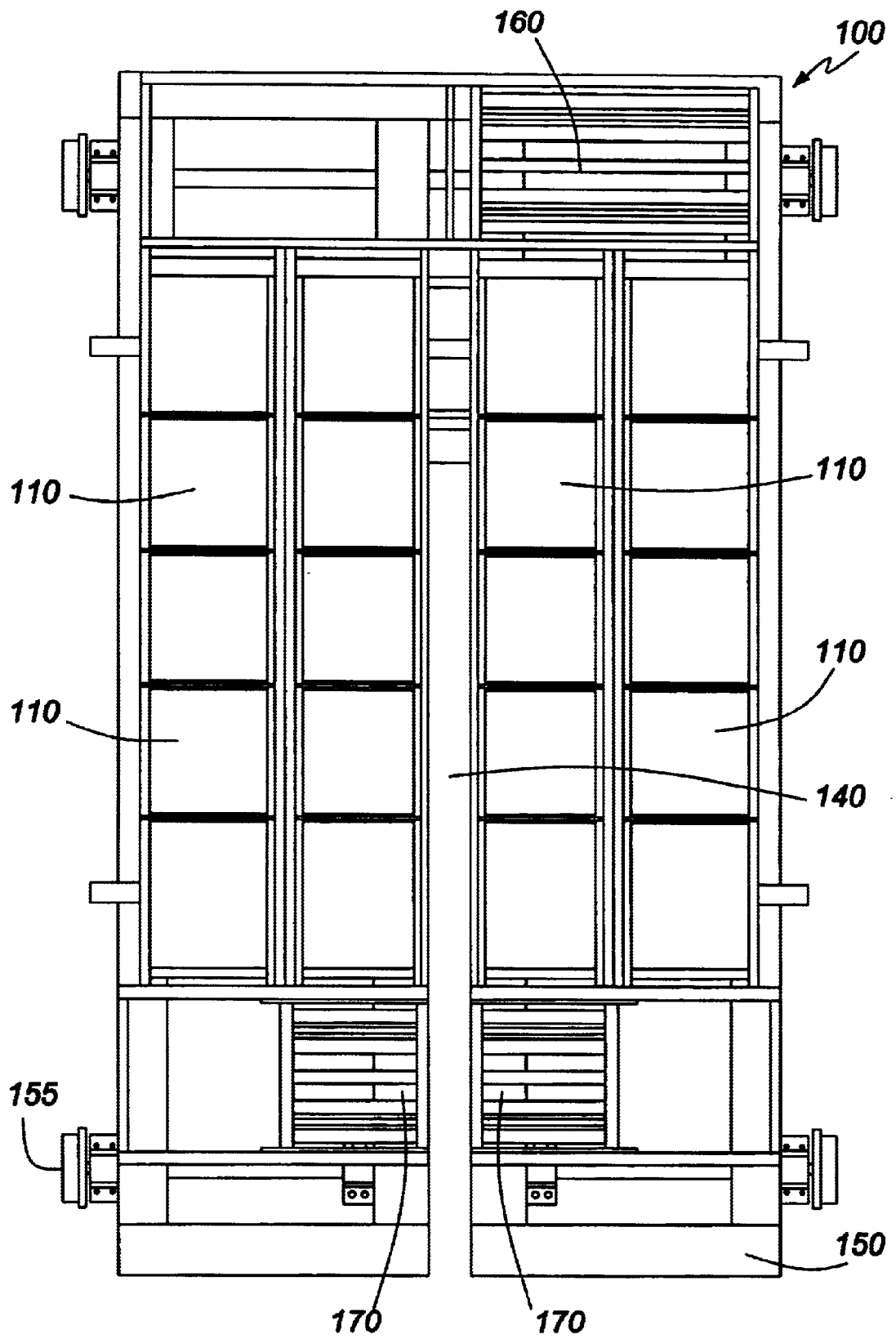
FIG. 2(C) shows a top view of the cartridge of the present invention.
Figure 2D:
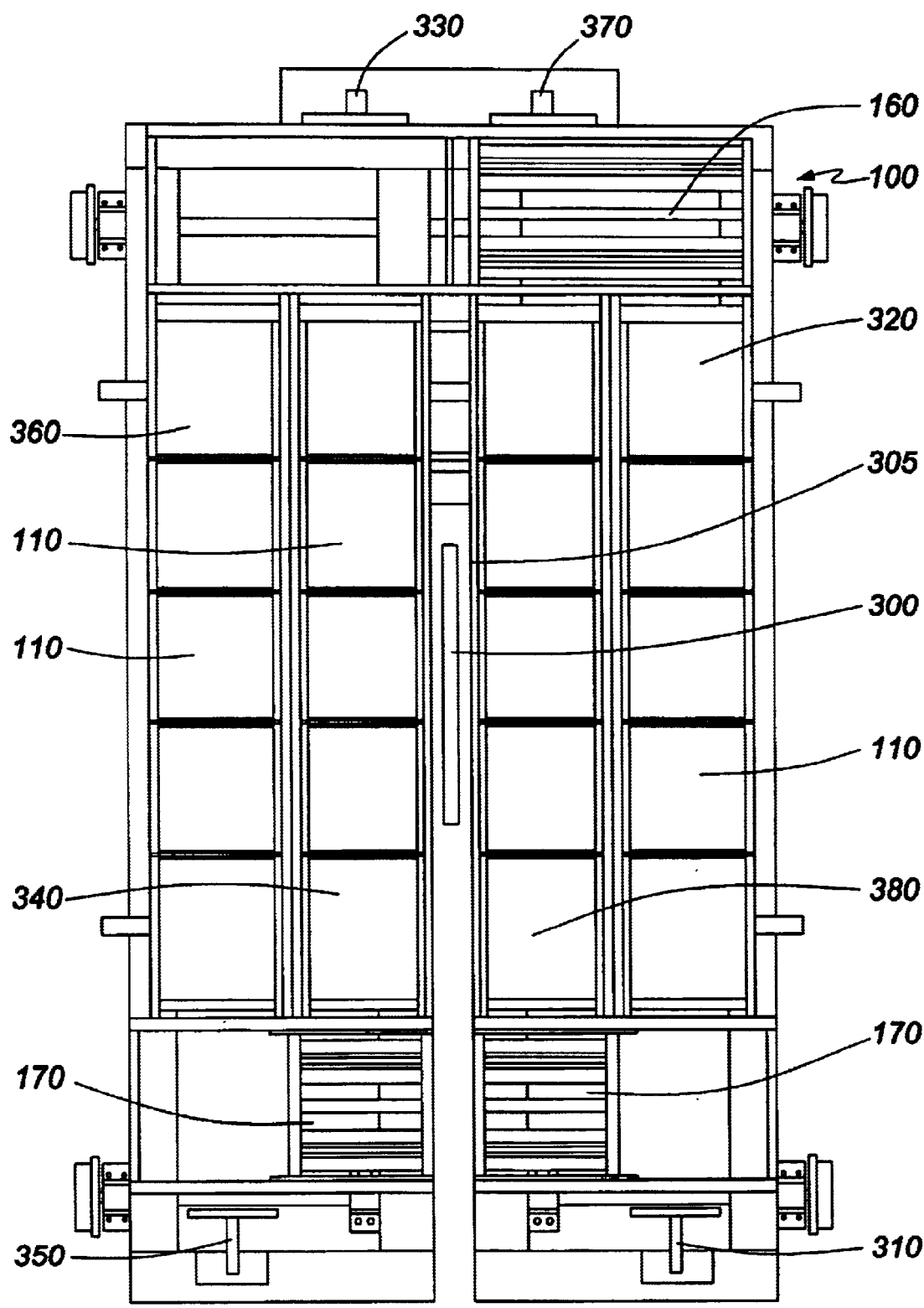
FIG. 2(D) shows a top view of the cartridge within the irradiation chamber.
Figure 3:
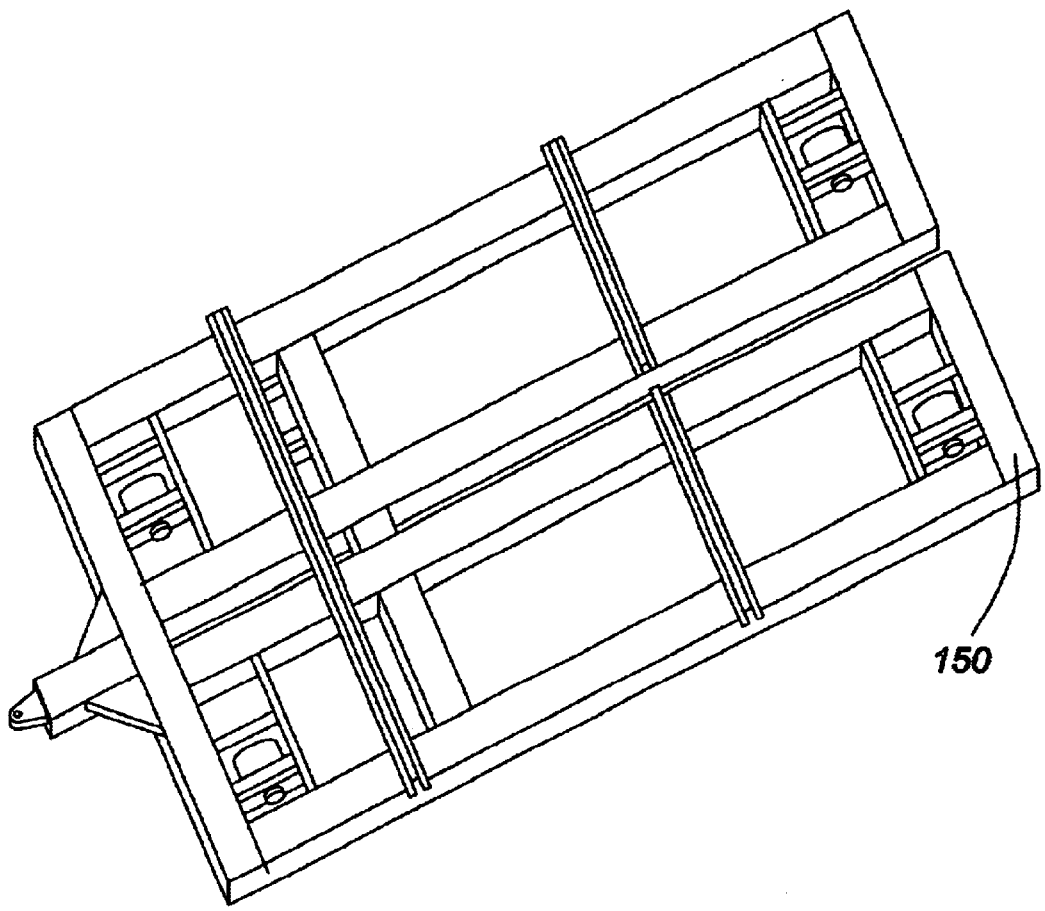
FIG. 3 shows an aspect of an embodiment of the present invention comprising the chassis of the cartridge feed system.

With reference to the FIGS. 1 to 3, there is shown components of the cartridge product irradiator of the present invention arranged in one of several possible configurations. The cartridge product irradiator (10) comprising a product irradiator chamber (20) with a cartridge feed system (30), a cartridge load and unload system (40), and a radioactive source (300; FIG. 2(D)) which can be stored below the chamber within a pool (305), and lifted into the product irradiation chamber during use.

Figure 7:
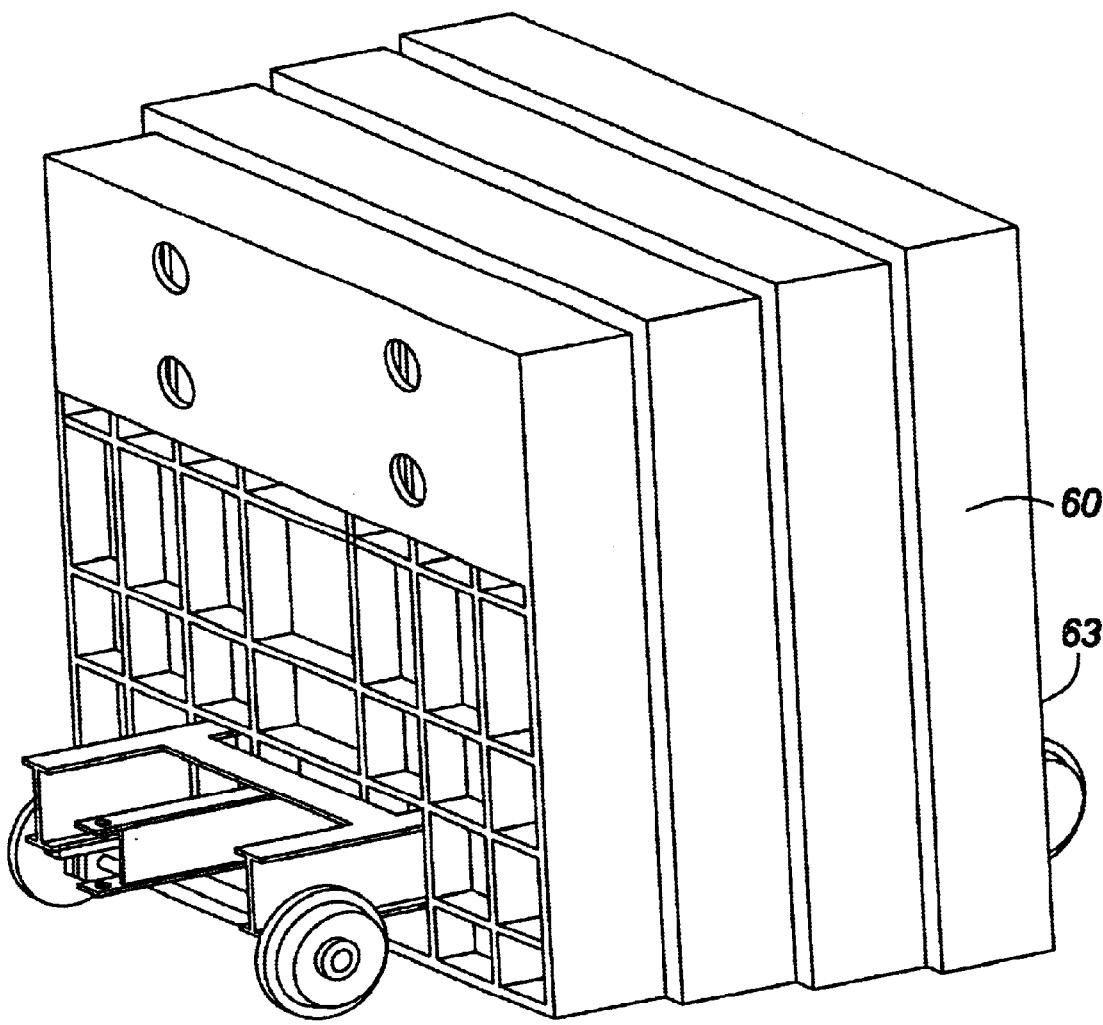
FIG. 7 shows an aspect of an embodiment of the present invention comprising the hot cell door of the cartridge feed system.

The cartridge feed system (generally shown as 30, FIG. 1 (A), (B) and (C)) is comprised of several components, including a cartridge (100; described in more detail below), a track system (50; FIG. 1 (B) and (C)) that permits movement of the cartridge (100) into and out from the irradiation chamber (20), a hot cell door (60; see also FIG. 7) that seals the irradiation chamber when the cartridge is positioned within the irradiation chamber, and optionally, a door trailer (65). A bed (70; see FIGS. 2(B) and 4) comprising a plurality of totes containing products, is capable of sliding onto the cartridge (100) when the cartridge feed system is withdrawn from the irradiation chamber.

Figure 9:
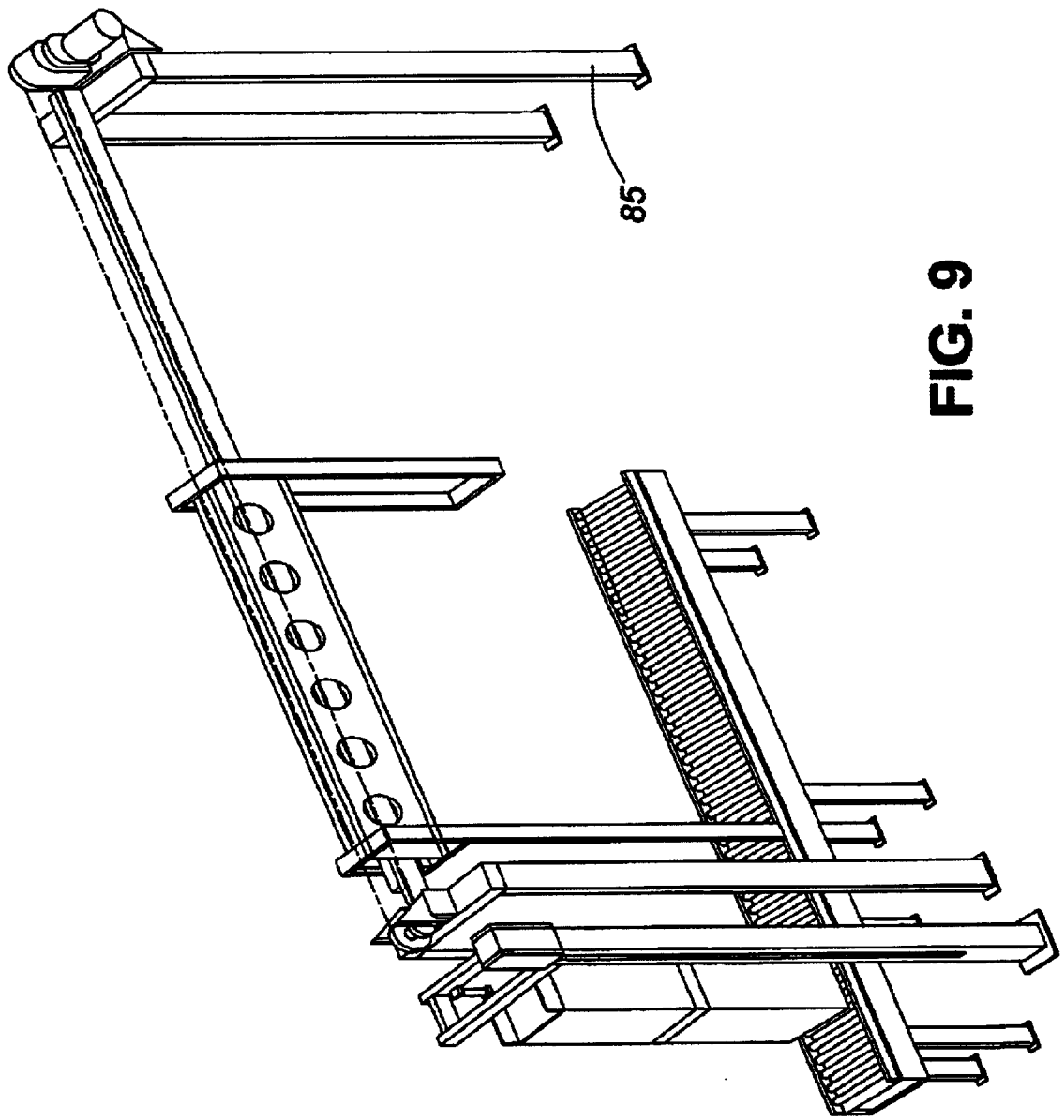
FIG. 9 shows an aspect of an embodiment of the present invention comprising a portion of the load-unload station of the load-unload system, showing a mechanism for removal of totes from the bed onto the load-unload conveyor.
Figure 10:
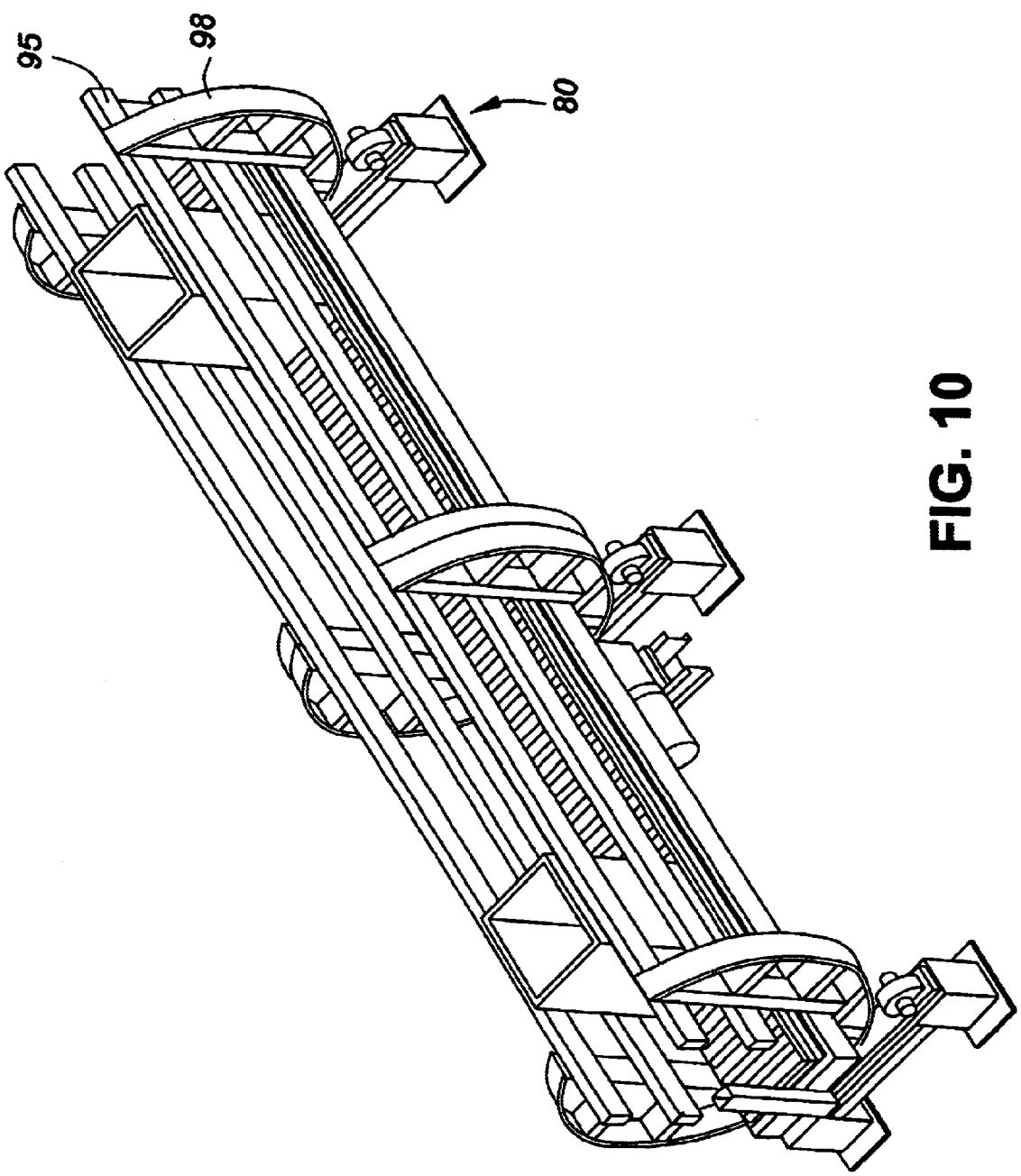
FIG. 10 shows an aspect of an embodiment of the present invention comprising the second portion of the load-unload station of the load-unload system, showing a mechanism for titling the totes during the loading or unloading process.

Associated with the cartridge feed system is a cartridge load and unload system (40) comprising a second track system (45), a storage indexer (85; see also FIG. 9) that moves product onto a load-unload conveyor (90), and to the load unload station (80; and FIG. 10). A bed (70; FIG. 2 (B)) positioned on the cartridge (100) can be moved from the cartridge along a second track system (45), to the load and unload station (80, see also FIG. 10), within the load-unload system (40), thereby permitting totes to be placed onto or removed from the bed (70).

Figure 8:
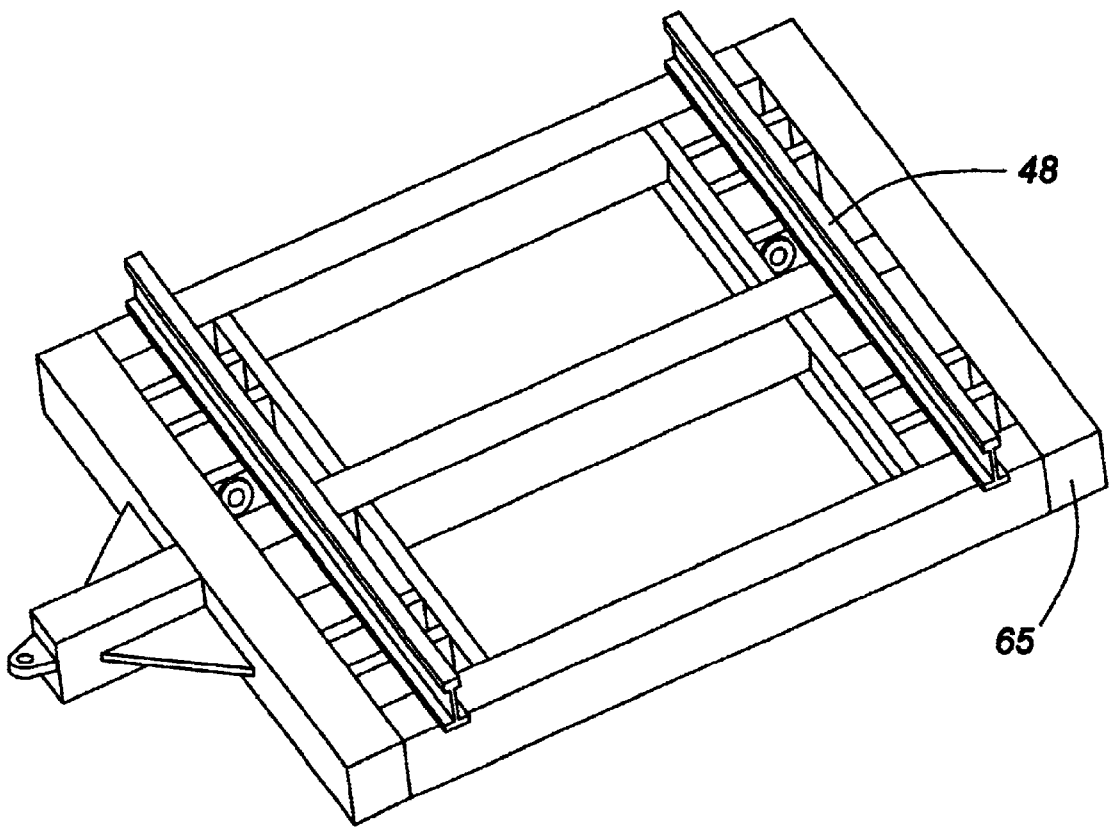
FIG. 8 shows an aspect of an embodiment of the present invention comprising the door trailer of the cartridge feed system.

FIG. 1(A) shows the cartridge feed system (30) outside the product irradiator chamber (20) in a position where the bed (70; FIG. 2(B); see also FIG. 4) comprising totes filled with products (only two totes shown in FIG. 1 for clarity, under normal use the bed of the cartridge is filled with totes) can be either positioned onto or removed from the cartridge (100). FIG. 1(B) shows the cartridge inserted within the product irradiation chamber, and the hot cell door (60) sealing the opening to the irradiation chamber. When inserted within the irradiation chamber, the track (48) of the optional door trailer (65; FIG. 8) lines up with the second track (45; FIG. 1(B)) and this permits movement of additional beds to and from the cartridge irradiator, or the load-unload system. For example, after irradiating a bed full of loaded totes, the cartridge feed system is removed from the irradiation chamber along track (50) and the first bed is displaced off the cartridge, and away from the load-unload system, along second track (45) by a second bed. The second bed is filled with totes to be irradiated. After the cartridge feed system, now carrying the second bed, is reinserted within the irradiation chamber along track (50), the track of the door trailer lines up with the second track (45) allowing for movement of the first bed towards the load-unload system for removal of products from the totes and refilling of the totes. It is to be understood that modifications to the described cycling of totes may be carried out. For example, a first bed filled with totes may be moved along track (45) past the track (50), when the cartridge feed system comprising a second bed filled with totes is inserted within the irradiation chamber. Upon removal of the cartridge feed system from the irradiation chamber, the first bed may then displace a second bed from the cartridge towards the load-unload system. Alternatively, the bed may be attached to the movable chassis (150) of the cartridge (100) and loaded using a fork lift or other suitable means, thereby obviating the need for second drive means and associated second track.

The cartridge is designed to receive a radioactive source (300; FIG. 2(D)) within the central portion of the cartridge when the cartridge is inserted into the irradiation chamber. The cartridge also incorporates a tote-redistribution system that shuffles the totes in a controlled manner past the source in order to minimize the DUR within each product. Therefore, removal of the carriers or totes from the cartridge or bed is not necessary during radiation processing. Thus the cartridge product irradiator allows for a plurality of products to be irradiated simultaneously and redistributes the products around the radiation source thereby making efficient use of the radioactive source. Further, utilizing a cartridge feed system permits one batch of product, loaded onto a first bed, to be irradiated, while at the same time permitting the unloading and loading of a second bed at the load-unload station. By simply exchanging beds on the cartridge, a rapid transfer of product into and out of the irradiation chamber may be obtained, thereby minimizing radiation chamber down time. The cartridge product irradiator (10) of the current invention significantly improves the efficiency of radioactive source utilization and allows the easy maintenance of components exposed to radiation with little or no down time of the irradiator.

The Cartridge Feed System

With reference to FIGS. 2 (A) to (C) there is shown a cartridge (100) of the present invention. The cartridge (100) comprises a chassis (150; see also FIG. 3) which can be moved along track (50) using wheels (155) into and out of the irradiation chamber (20), a removable bed (70; also see FIG. 4), a hot cell door (60; see FIG. 1 (A), 1 (B), 7), and a door trailer (65; FIGS. 1(A), (B)). The bed (70) comprising a conveyor system (120) comprising conveyors (130) which may be loaded with a plurality of totes (110) that rest on conveyors (130) of the conveyor system (120). The conveyor system is attached to the bed (70), and the bed may be slidably positioned onto the movable chassis (150) using second track (45). When the bed properly positioned on the movable chassis, the bed is locked to the chassis, by any suitable means, to prevent any movement of the bed within the cartridge when the cartridge is introduced to, or withdrawn from, the irradiation chamber (20).

The hot cell door (60) is of a similar thickness and density as the walls of the irradiation chamber. Preferably, the hot cell door comprises a stepped frame that matingly engages a corresponding stepped recess in the irradiation chamber wall, to minimize any radiation leakage from the irradiation chamber when the source is lifted into the chamber. The lower frame hot cell door is tethered to the chassis and move along track 50 using a set of wheels (63). Appropriate fitting are present within the hot cell door to permit coupling with drive motors and hydraulic or pneumatic cylinders as outlined below.

In the embodiments shown, the conveyor system (120) comprises two conveyors (130) on each side of the cartridge, however, it is to be understood that a different number of conveyors may be employed as desired depending upon the size of the irradiation chamber and cartridge feed system. Each tote (110) comprises a plurality of products (not shown) to be irradiated. As will be appreciated with reference to FIGS. 2(C), (D), and FIG. 3, the chassis (150) is slotted longitudinally part way down the mid region of the chassis, to allow a radioactive source rack (300, FIG. 2(D)) to be positioned between the centrally located stacked totes (110) when the cartridge (100) is placed within the irradiator chamber (20) of the cartridge product irradiator. The centrally positioned conveyors (130) of bed (70) are also spaced apart so that a slot (140) is disposed between the central conveyors (130) and the totes located on these conveyors (110).

The cartridge (100) of the present invention may further comprise a tote transfer system for repositioning totes (110) or carriers during irradiation processing. Any method or transfer system known in the art may be used to reposition the totes. Preferably, the tote transfer system is part of the chassis (150). By integrating a tote transfer system within the cartridge (100), the number of moving parts permanently located within the irradiation chamber is significantly reduced and minimizes exposure of the cartridge components to irradiation. Moreover, cartridges requiring maintenance may be replaced by other cartridges thereby significantly reducing the down-time of the cartridge product irradiator.

Figure 5A:
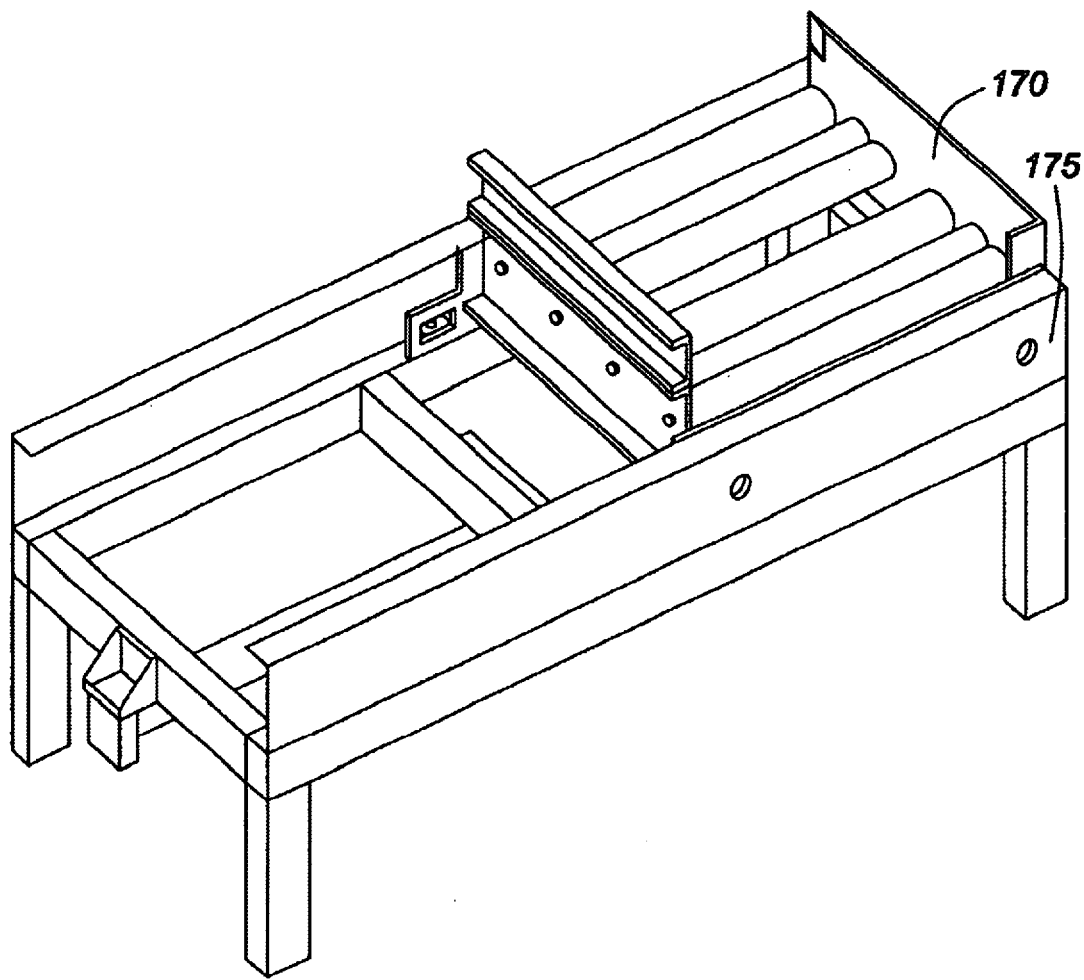
FIG. 5(A) shows the proximal transfer element of the cartridge feed system.
Figure 5B:
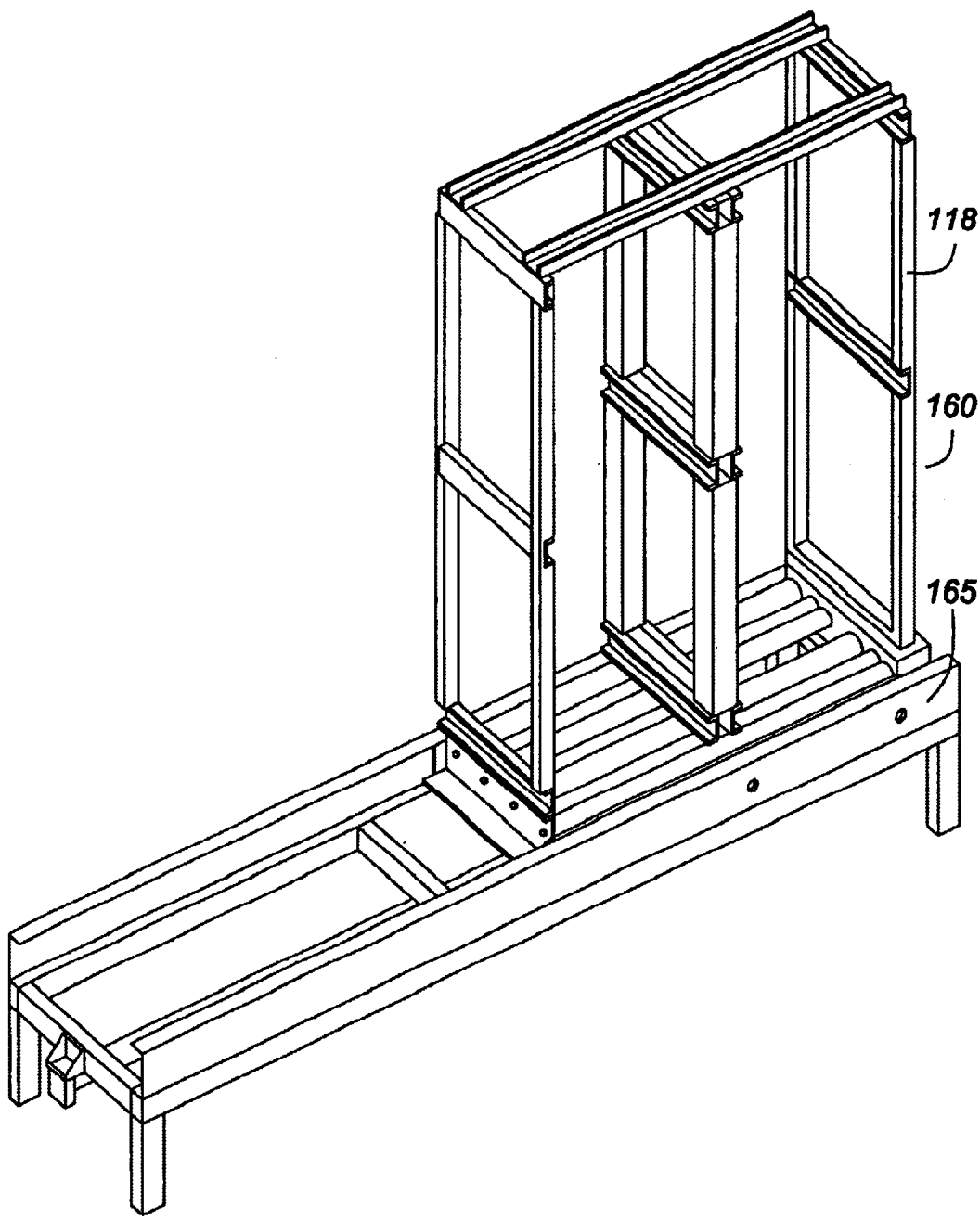
FIG. 5(B) shows the distal transfer element of the cartridge feed system.

In the embodiment shown in FIGS. 2(D), 5(A) and 5(B), the tote transfer system comprises a plurality of transfer elements, for example but not wishing to be limiting, a distal transfer element (160; see also FIG. 5(B)) and two proximal transfer elements (170; also see FIG. 5(A) which shows one of the two proximal transfer elements) attached to opposite ends of the movable chassis (150) of the cartridge (100).

Also attached at opposite ends of the movable chassis (150) are a plurality of pushing systems. In the embodiment shown in FIG. 2(D), there are four push systems designated as pushing systems 1 to 4 (310, 330, 350 and 370 respectively), however, the number of pushing systems may be modified as required, and may depend upon, for example, the number of conveyors( 130) positioned on cartridge 100. Each push system may comprise, but is not limited to, an air or hydraulic cylinder (not shown), attached to the chassis (150), so that the piston may be extended or retracted as required to move totes along the conveyor system (120).

The distal transfer element (160) and the proximal transfer elements (170) are capable of receiving stacked totes (110) displaced from the conveyor (130) by the pushing system. The conveyors (130) of the conveyor system (120) are coplanar with the distal (160), and proximal (170) transfer elements permitting stacked totes (110) to be slidably repositioned from the conveying system (120) of the cartridge (100) to either the proximal transfer elements (170) or the distal transfer element (160) by the pushing system. This shuffling of totes along the conveyors and onto the proximal and distal transfer elements permits the movement of product past the radiation source in an indexed, controlled manner so that exposure of the product to the radiation source is optimized thereby obtaining a minimal DUR.

The distal transfer element (160) and proximal transfer elements (170) are capable being slidably positioned along the ends of the movable chassis (150) and in a direction perpendicular to the conveyers. This may accomplished by using a second push system (not shown in the Figures) that moves each of the distal and proximal transfer elements. Any suitable second push system may be used, for example, but not 5 limited to air or hydraulic cylinders attached between the chassis (150) and either transfer element (160, 170) that permits the indexed placement of either transfer element along tracks (165, and 175, respectively) located at each end of the chassis. In the embodiment shown, the distal transfer element (160) is capable of sliding the ,entire width of the movable chassis-( 150) while each of the proximal transfer elements 10 (170) is capable of sliding approximately half of the width of the movable chassis (150). The distal transfer element (160), proximal transfer elements (170), pushing systems (310, 330, 350, 370), and second push system (not shown) allow the stacked totes (110) of the cartridge (100) to be repositioned within the bed (70) while undergoing radiation processing.

FIGS. 1 (B) and 2 (C) show the cartridge (100) inserted into the irradiation chamber (20) of the current invention. In the embodiment shown, the cartridge (100) is placed within the irradiation chamber (20) so that a hoist mechanism (not shown) passes through slot (140) to permit the lifting and lowering of the source rack (300). The hoist mechanism may include any suitable means that permits lifting and lowering of the source rack such as a cable, or chain. When not in use, the source rack (300) is retained at within a pool (305), for example, when the cartridge feed system is withdrawn from the irradiation chamber (20) and the hot cell door (60) to the irradiation chamber is open. When the feed cartridge system is positioned within the irradiation chamber, the hoist mechanism raises the source rack (300) out of the pool (305) and into alignment within the totes within the slot (140). Preferably, the source rack is positioned equidistant from both ends and the top and bottom of the two interior rows of totes.

While undergoing irradiation processing, the totes (110) of the cartridge (100) are interchanged relative to the source (300) to ensure that all the totes and the products in the totes receive a relatively even dose of radiation and attain a low DUR. Any method of shuffling the totes around the source rack be employed. Without wishing to limit the invention in any manner, the following method maybe used to redistribute the totes within the conveyor system of bed (70).

After entry of the cartridge (100) into the irradiation chamber (20), lifting of the source rack (300), and following a suitable dwell time in which the totes of the cartridge have been irradiated, the first pushing system (310) extends approximately twice the width of a tote (110) to force the distal tote of the first row (320) into the distal transfer element (160). The distal transfer element (160) then shifts along the width of the movable chassis (150) until the tote (320) rests against a second pushing system (330). The second pushing system (330) then extends approximately one tote width to force tote 320 onto the conveyor and displace the proximal tote of the third row (340) from the conveyor (130) onto the first proximal transfer element (170). The first proximal transfer element (170) moves horizontally along the width of the chassis (150) until the tote rests against a third pushing system (350). The third pushing system (350) extends approximately one tote length to force tote 340 onto the conveyor, and displace the distal tote of the fourth row (360) from the conveyor (130) onto the distal transfer element (160) which had previously migrated to this position in transporting the previous tote. The distal transfer element (160) then returns to its original position at the start of the operation. At this point, the fourth pushing system (370) extends approximately one tote length forcing tote 360 (now on the distal transfer element)onto the conveyor (130) and displaces the proximal tote of the second row (380) from the conveyor onto the second proximal transfer element (170). The second proximal transfer element (170) moves horizontally along the width of the chassis (150) until the tote rests before the first pushing system (3 10). This cycling of totes repeats as needed passing the totes past the source rack (300). At the end of the irradiation period, the first pushing system (3 10) extends approximately one tote length to place the tote onto the conveyor, and not displace a tote from the opposite end of the conveyor.

In the embodiment described above, totes are cycled around a source rack by the use of distal transfer elements (160), proximal transfer elements (170) and pushing systems (310, 330, 350, 370). However, any method of transferring or cycling totes around a radioactive source and any equipment to effect such transfer may be used and is fully contemplated by the current invention. For example, but not to be considered limiting, the pushing systems may comprise pistons which are pneumatically or hydraulically controlled, or drive motors moving the conveyor and transfer elements (160, 170) via chain, toothed wheel, gear or other mechanisms as would be known to one of skill in the art.

Figure 4:
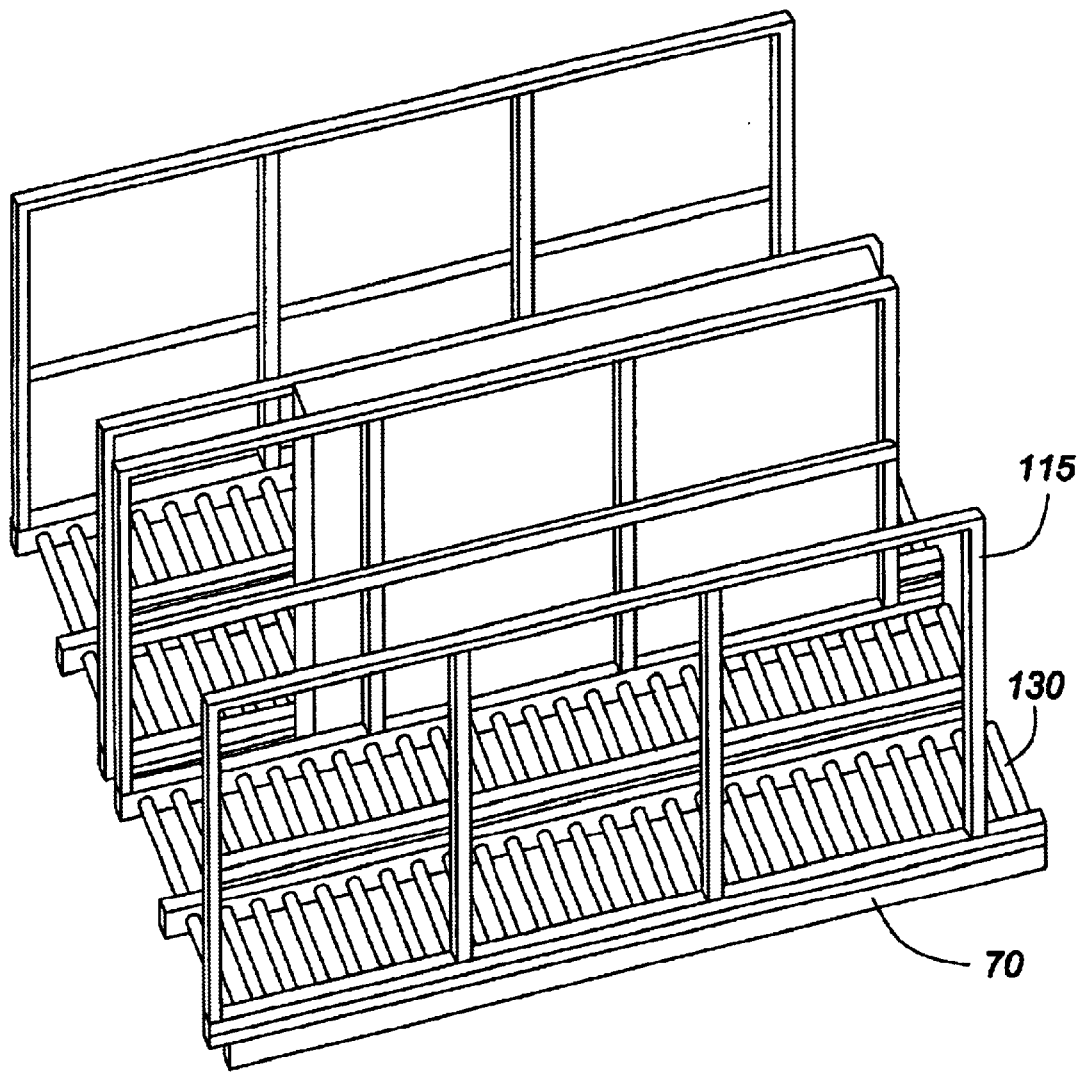
FIG. 4 shows an aspect of an embodiment of the present invention comprising the bed of the cartridge feed system.
Figure 6:
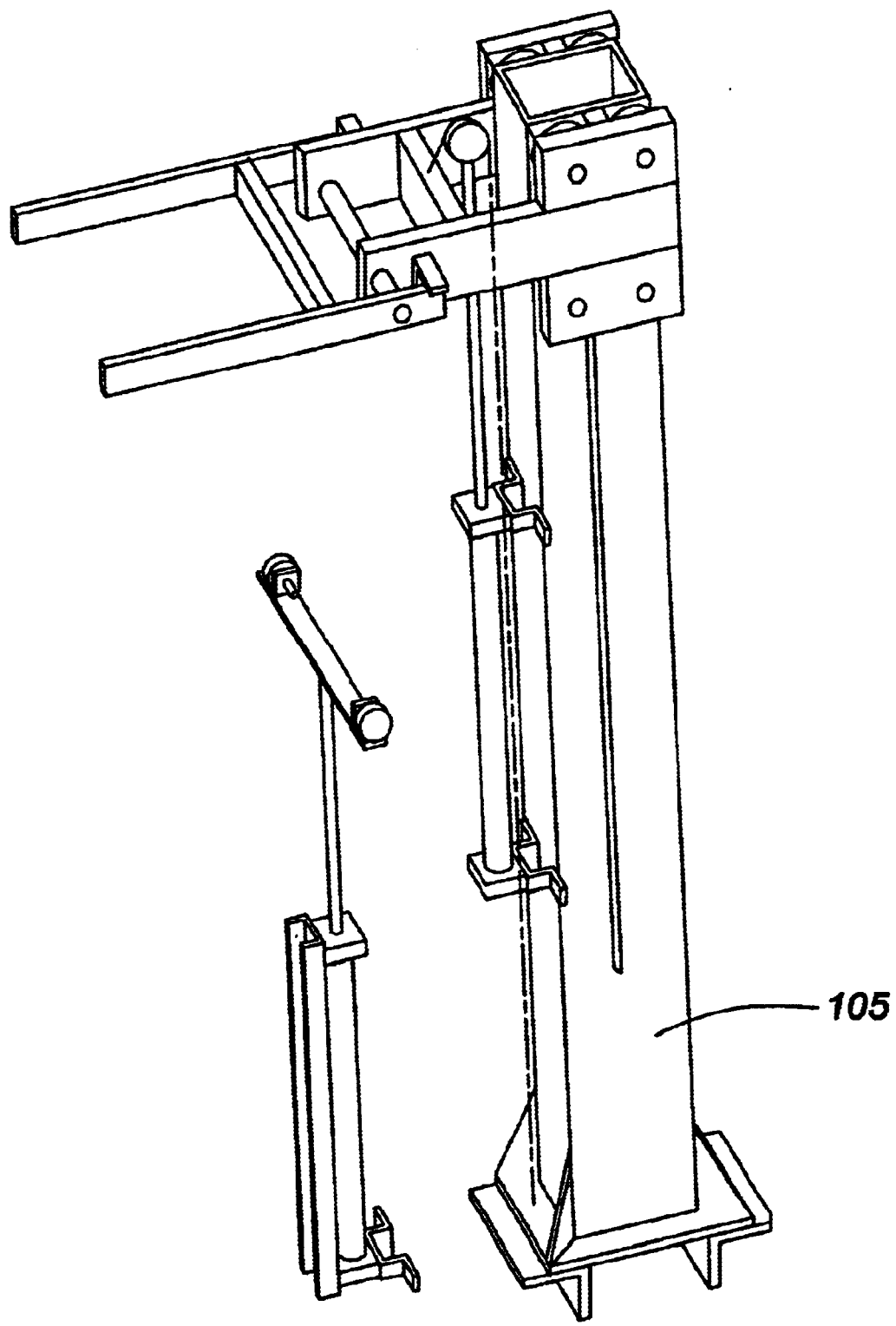
FIG. 6 shows an aspect of an embodiment of the present invention comprising the tote lifting means of the cartridge feed system.

The process as described moves the toes in a sequential manner past the source rack, however, the bed (70) may also comprise two layers of totes. In such an embodiment, a tote frame(115; FIGS. 1(C), 4) is mounted on the bed (70), and an analogous transfer element tote frames (118; FIGS. 1(C), 5(B)) are positioned on the proximal and distal transfer elements (160, 170). These frames (155, 118) may also be used to support totes on the upper level. In order to ensure as uniform a dose as possible within the product, the totes are sequentially shuffled from the lower to upper level so that each tote may pass by the source rack in both the lower and upper levels. The transfer of totes between levels may be accomplished using any suitable height transfer system capable of either moving a tote from the lower level up to the upper level or visa versa, such as a piston elevator that presses against the bottom surface of the tote, or a fork elevator, that interacts with external pins or channels of the tote. An example, which is not to be considered limiting, of a tote elevator is presented in FIG. 6. This tote elevator comprises forks capable of rotating vertically, or travelling horizontally so that they can be moved back and away from a tote, and then brought forward to engage the tote and either lift or lower the tote, vertically, as required. The tote elevator (105) maybe positioned at either end of the chassis. For example, which is not to be considered limiting, in FIG. 1(C) the tote elevator (105) is adjacent the proximal transfer element.

The push systems (310, 330, 350, 370), transfer elements (160, 170) and tote elevator (105) of the current invention may be pneumatically, hydraulically or electrically driven. Each of these systems requires radiation-shielded hoses, wiring and connections or couplings to the outside of the irradiation chamber. These connections and couplings allow fluid, compressed air or electricity to be delivered from the exterior of the cartridge product irradiator and to the cartridge inside the cartridge product irradiator.

In a preferred embodiment the pushing systems (310, 330, 350, 370), transfer elements (160, 170) and the tote elevator (105) which reposition the totes (110) of the cartridge (100) are preferably located on the cartridge (100). These systems may be integrated into the movable chassis (150) or the bed (70, FIGS. 2(B), 4) of the cartridge, or aspects of these systems may be divided between the chassis (150) and the bed(70). Since it is generally preferred to use as few moving parts within an irradiation chamber due to the destruction of materials by the radiation source, integrating the pushing systems, transfer elements, and tote flipping means on the chassis (100), the bed (70) or at any other place on the cartridge(100) reduces the number of moving parts within the irradiator chamber and further permits servicing of movable parts without shutdown of the irradiator. Such a system increases the efficiency of use of the radioactive source.

While it is generally preferred to have the tote transfer system on the cartridge, it is also contemplated that the tote transfer system may be located within the irradiation chamber of the cartridge product irradiator.

Cartridge Containers or Totes

In cases where totes (110) or containers are stacked, it is preferable that the totes (110) comprise a means which allows a tote (110) to be efficiently stacked. Without wishing to be limiting, such a means may include a lip on the upper edge of the tote and a ridge on the bottom edge of the tote such that the lip on the upper edge of a bottom tote fits within the ridge on the bottom portion of an upper tote. However, any other means to aid stacking of the totes may also be used.

The totes of the current invention may be of any size, however, it is generally preferred that the cartridge comprise totes of the same size, and filled with products of approximately equal densities. It is also possible that the carriers or totes of the present invention may be insulated in order to ensure that the products contained therein are maintained at a desired temperature. Such insulated carriers may also be used should the building housing, or the irradiator chamber not be temperature controlled. As would be evident to one skilled in the art, the totes or containers of the present invention comprise materials which allow the passage of radiation.

The loading and unloading of totes (110) or carriers may take place manually or via robotics, for example but not limited to, using a load-unload system (80, 90) as shown in FIGS. 1, 9 and 10. The automated handling of totes using a load-unload system may be effected using any suitable means as would be known to one of skill in the art. An example of a robotic load-unload system, which is not to be considered limiting in any manner, is shown in FIG. 9. In this device, the bed (70; not shown in FIG. 9) moves under an overhead arm that travels in direction parallel to the conveyor system (120) of the bed (70). One or more downward extending forks of the overhead arm are capable of either pulling totes off the conveyor system of the bed (70), and transferring these totes onto the load-unload conveyor (90; see FIG. 1), or pushing toes from the load-unload conveyor (90) and onto the conveying system (120) of the bed (70). The one or more downward extending forks may be powered by any suitable drive means including direct drive motors, or chain, gear drives and the like. Totes transferred onto the load-unload conveyor (90) by the overhead arm then move to a load unload station, for example but not limited to, that shown in FIG. 10. At this station, totes may either be loaded onto the load-unload conveyor (90), or unloaded from this conveyor. The totes may be tilted using a tote tilt comprising a frame (98) that supports the totes, and a series of guides (98), that permit the frame and conveyor to rotate. In this manner, totes may be rotated and slide onto a pallet or other moving or storage device without having to lift the tote off the conveyor. It is to be understood that alternate load-unload stations may be employed. For example, the totes may migrate along the load-unload conveyor and be directly loaded onto a pallet in their vertical orientation, or there may be a combination of manual and robotic procedures.

The totes (110) are configured to optimize packaging efficiency and are dimensioned to match the pallet foot print in order to accommodate layers of a pre-palleted product and ensure that carriers or totes can be easily loaded and unloaded as needed. Following treatment within the irradiator, the product trays are easily re-palleted for shipping. In doing so, the product throughput within the irradiator of the present invention is greatly enhanced over that of prior art irradiators.

Translocation of the Cartridge and Associated Components

The cartridge (100) of the cartridge product irradiator moves into and out of the irradiator chamber (20). Any method known in the art may be used to allow movement of the cartridge (100). For example, but not wishing to be limiting the cartridge (100) may comprise wheels (155) and be moved on rails, tracks, or other suitable system. If a track or rail is used, 1 then it is preferred that the track or rail be continuous with the interior of the irradiation chamber. The cartridge feed system further comprises a drive system for effecting movement of the cartridge (100). Again, any drive system known in the art may be used to effect movement of the cartridge, including, but not limited to, direct drive motors, chain, gear, toothed wheel or piston drives.

In addition, the bed (70) can be disengaged from the cartridge and may also undergo movement. This disengagement allows the bed (70) to be loaded with carriers or totes at a remote location and moved onto the chassis. In this embodiment, there is a second drive system for effecting movement of the bed (70) along the second track (45). Again, any drive system known in the art may be used to effect movement of the cartridge, including, but not limited to, direct drive motors, chain, gear, toothed wheel or piston drives.

Alternatively, it is also contemplated that the conveyor system and bed may be attached to the movable chassis (150) of the cartridge (100) and loaded using a fork lift or other suitable means, thereby obviating the need for second drive means and associated second track.

Irradiation Chamber

The irradiation chamber (20) of the cartridge product irradiator houses the radioactive source within a source rack (300). Any suitable radioactive source may be used within the source rack. For example, but without limiting the invention in any manner, cobalt 60 or cesium 137 may be used. The source is typically encapsulated and placed within a module comprising multiple capsules. The modules are placed within the source rack (300) in such a manner that a module and individual sources can be removed or relocated within the source rack as required.

When the source rack (300) is not in use, it is stored within a pool (305) located below the irradiation chamber (20). The source rack (300) may be pulled up into the irradiation chamber as required by a source rack hoist (not shown). The source rack (300) is preferably counter weighted so that return of the source rack into the subterranean pool takes place using gravity. Such an arrangement would permit the return of the source rack to the pool in the event of a power loss.

The position and size of the source rack within the irradiation chamber may be modified in order to permit typical product-source exposures. For example, either a source-overlapping-product (where the source extends beyond the perimiter of the product) or product-overlapping-source (where the product perimeter extends beyond the edge of the source) configuration may be used with the source rack-product arrangement of the present invention. It has been determined that a product-overlapping-source (POS) configuration generally results in a more efficient utilization of radiation provided by the source than a source-overlapping-product (SOP) configuration. A POS arrangement is preferred, however, it is considered within the scope of the present invention that a SOP configuration may also be used within the present product irradiator under certain conditions.

As there is no need for substantial product handling within the irradiation chamber of the current invention, the irradiation chamber (20) need only be slightly larger than the size of a cartridge (100). However, different cartridge sizes, comprising totes of different sizes may also be used, within the irradiation chamber (20).

The irradiation of products produces ozone which is toxic and corrosive. Therefore, the irradiation chamber may be equipped with a ventilation system for removing ozone that is produced during the irradiation of products. The irradiation chamber may also be climate controlled to maintain products at a desired temperature.

A wall of the irradiation chamber (20) may also be equipped with one or more couplings (not shown) which engage the cartridge (100) and provides electricity, compressed air, or fluids to any of the tote repositioning devices on the cartridge (100) which may be electrically, pneumatically, or hydraulically controlled. The coupling may be located in any wall of the irradiation chamber or the coupling may be located in the hot cell door (60) of the irradiation chamber. In the first case, the cartridge (100) is advanced into the irradiation chamber (20) until the coupling engages a suitable receiving device (not shown) on the cartridge (100). If the coupling is located on the hot cell door (60), then either closing of the chamber door engages the receiving device on the cartridge (100), or the hoses, wires and cables pass through the hot cell door and any removable coupling of these hoses, wires and cables takes place outside of the door.

The cartridge product irradiator of the present invention is situated within a suitable building typically made from concrete, lead or other material that helps reduce radiation levels on the outside of the structure. The environment within the building may be temperature controlled and can vary from about −25° C. to about 25° C. in order to match warehouse temperatures. The roof of the building may comprise a multipiece roof plug permitting an alternate access to the irradiation chamber, or source, or elsewhere for maintenance as required. Below the irradiation chamber is a pool (305) that houses the source rack (300), when the source is not in use.

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not be used to limit the scope of the present invention in any manner.

EXAMPLE 1 Product densities of 0.1–0.5 g/cc

Based on the relationship between a product and source, using the cartridge product irradiator of the present invention, the efficiency of radiation utilization with varied product density and product configuration can be determined. In this example, the radiation source is cobalt 60, and a range of product densities are processed, including low density medical supplies up to high density red meat.

The product is stacked in totes (45.7 cm width×0.62.2 cm length×99.1 cm height). In the embodiment disclosed in FIGS. 1 and 2, 40 totes may be processed, with each layer of the bed comprising 20 totes. Therefore, each tote is indexed 80 times (40 positions on each level) while within the irradiation chamber, and moves or shuffles to each indexed position at least once during a run. A four-pass cartridge is shown in FIGS. 1 and 2, however, a two-pass, or six pass bed design may also be employed.

The results for treating a range of product densities is presented in Table 1.

TABLE 1

| Product Packing Density | Product Throughput/h/100 kCi ($D_{min}$ = 25 kGy) | | | Cobalt Utilization | Dose Uniformity |
| --- | --- | --- | --- | --- | --- |
| (g/cc) | m³ | Totes | ft³ | Efficiency | Ratio (DUR) |
| 0.00 | 0.331 | 1.182 | 11.7 | 0.0 | 1.27 |
| 0.10 | 0.292 | 1.043 | 10.3 | 13.6 | 1.32 |
| 0.20 | 0.254 | 0.907 | 9.0 | 23.7 | 1.38 |
| 0.30 | 0.221 | 0.789 | 7.8 | 31.0 | 1.45 |
| 0.40 | 0.190 | 0.679 | 6.7 | 35.5 | 1.55 |
| 0.50 | 0.162 | 0.579 | 5.7 | 38.0 | 1.69 |

The DUR indicates the range of absorbed dose a product has received. The difference between the dose received throughout the product arising from exposure to the radiation source is reflected in the DUR. DURs of up to about 1.7 are considered acceptable within the art of red-meat irradiation. As can be determined from Table 1, DURs from about 1.27 to 1–69 are obtained over a product density up to 0.5 g/cc.

Table 2 presents data on product throughput using the cartridge product irradiation of the present invention for a range of Source Activities.

TABLE 2

| Product Throughput (m³/n/ 100 kCi) | Product Packing Density (g/cc) | Low Cost Irradiator Timer Set to Achieve 10 kGy Dmin Source Activity (kCi) | | | | | | |
|---|---|---|---|---|---|---|---|---|
| | | 50 | 100 | 200 | 500 | 750 | 1000 | 1500 |
| 0.331 | 0.00 | 40.9 | 20.4 | 10.2 | 4.1 | 2.7 | 2.0 | 1.4 |
| 0.292 | 0.10 | 46.3 | 23.2 | 11.6 | 4.6 | 3.1 | 2.3 | 1.5 |
| 0.254 | 0.20 | 53.2 | 26.6 | 13.3 | 5.3 | 3.5 | 2.7 | 1.8 |
| 0.221 | 0.30 | 61.2 | 30.6 | 15.3 | 6.1 | 4.1 | 3.1 | 2.4 |
| 0.190 | 0.40 | 71.2 | 35.6 | 17.8 | 7.1 | 4.7 | 3.6 | 2.4 |
| 0.162 | 0.50 | 83.5 | 41.7 | 20.9 | 8.3 | 5.6 | 4.2 | 2.6 |

All documents referred to herein are incorporated by reference.

The present invention has been described with regard to preferred embodiments. However, it will be obvious to persons skilled in the art that a number of variations and modifications can be made without departing from the scope of the invention as described herein.

The embodiments of the invention in which an exclusive property of privilege is claimed are defined as follows:

1. A cartridge product irradiator comprising,
   i) an irradiation chamber,
   ii) a cartridge feed system, comprising:
      a) a bed comprising a conveyor system; and
      b) a movable chassis receiving said bed, said movable chassis entering into, or withdrawing from said irradiation chamber;
   iii) a tote transfer system positioned on said cartridge feed system, said tote transfer system for repositioning one or more than one tote on said bed; and
   iv) a hot cell door that seals said irradiation chamber.

2. The cartridge product irradiator of claim 1 wherein said tote transfer system comprises:
   i) a push system for pushing one or more totes along said conveyor system; and
   ii) at least one transfer element for receiving totes displaced by said push system.

3. The cartridge product irradiator of claim 2 wherein said movable chassis comprises said tote transfer system.

4. The cartridge product irradiator of claim 2 wherein said tote transfer system additionally comprises an elevator means for repositioning a tote from a first level to a second level.

5. The cartridge product irradiator of claim 2 wherein said tote transfer system comprises two proximal transfer elements and one distal transfer element.

6. The cartridge product irradiator of claim 3 wherein said push system comprises pneumatic or hydraulic cylinders.

7. The cartridge product irradiator of claim 1 wherein said irradiation chamber comprises a radioactive source.

8. The cartridge product irradiator of claim 7 wherein said radioactive source comprises a gamma radiation source.

9. The cartridge product irradiator of claim 8 wherein said gamma radiation source is selected from the group consisting of cobalt 60 and cesium 137.

10. The cartridge product irradiator of claim 1 wherein said hot cell door is attached to said movable chassis.

11. The cartridge product irradiator of claim 1 wherein said movable chassis further comprises a door trailer.

12. The cartridge product irradiator of claim 1 wherein said movable chassis enters and withdraws from said irradiation chamber on a track.

13. The cartridge product irradiator of claim 12, wherein said bed is adapted to disengage from said movable chassis and translocate from said chassis along a second track to an area for loading or unloading.

14. The cartridge product irradiator of claim 13, wherein said area for loading or unloading comprises an automated load-unload system.

* * * * *